July 31, 1934.   C. V. MORINE   1,968,417
PINEAPPLE STUMP CHOPPER
Filed March 13, 1933
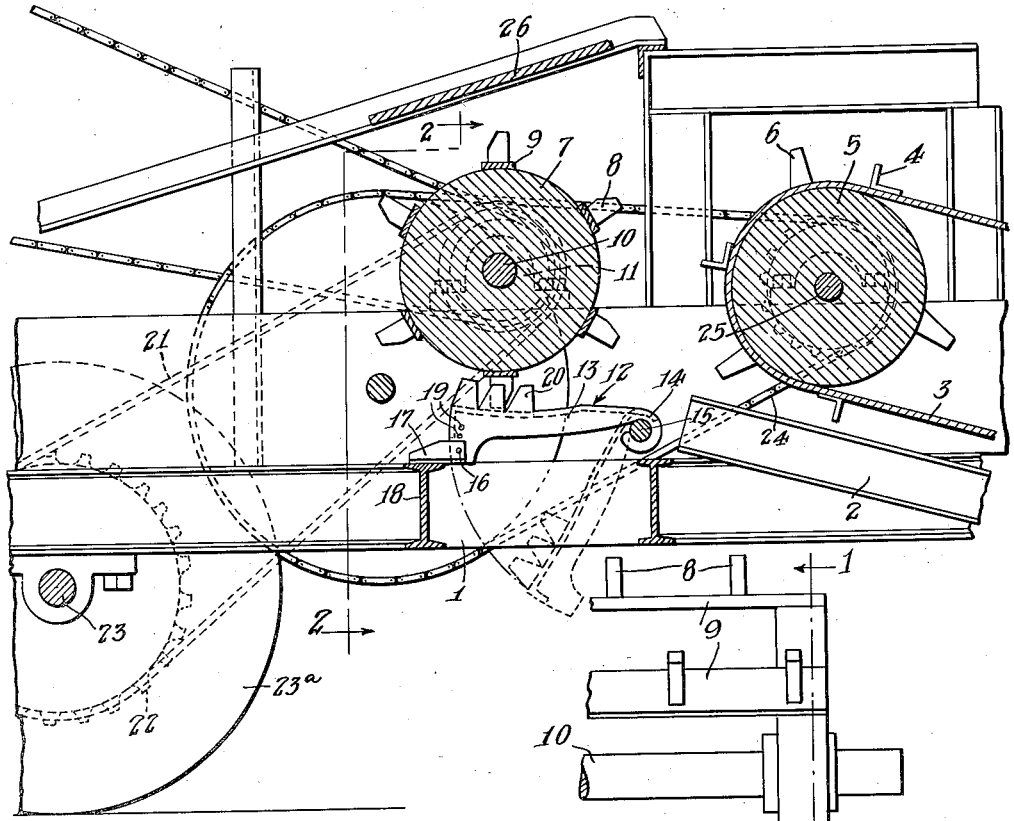
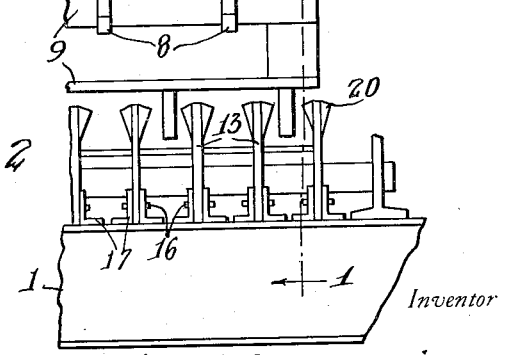
Inventor
Charles Victor Morine
By Lyon & Lyon
Attorneys

UNITED STATES PATENT OFFICE 1,968,417

PINEAPPLE STUMP CHOPPER

Charles Victor Morine, Wahiawa, Honolulu, Territory of Hawaii, assignor to California Packing Corporation, San Francisco, Calif., a corporation of New York Application March 13, 1933, Serial No. 660,538

6 Claims. (Cl. 146—117)

This invention relates to a chopping apparatus, and while the invention can be employed for chopping up any relatively soft bodies, it is intended to be used particularly for chopping up pineapple stumps.

In the culture of pineapples, when the field of the plants arrives at a point where it is no longer productive, it is the practice to plow the growth under, and after a period of cover-cropping, plowing, etc., the field is replanted to pineapples.

The plants grow to a height of from two to four feet, and unless the pineapple stumps are cut into pieces, they may lie in the soil for months before decaying, and may commence to grow. The present method of clearing the old pineapple land of these stumps at present, is expensive, and is not thorough enough to insure rapid decomposition of the pineapple stumps in the ground before the replanting takes place.

The general object of this invention is to provide a chopping mechanism capable of operating upon a relatively soft material such as vegetable growth, to cut the same into smaller pieces.

In the use of this machine for chopping pineapple stumps, a plow is carried on the frame of the machine, which plows up the stumps, and these stumps are then advanced automatically by the machine into the chopper. If a foreign body such as a large stone finds its way into the chopper, there is danger of breaking the chopper teeth or damaging the chopper mechanism. One of the objects of this invention is to provide means for overcoming this difficulty, and to provide a mounting for the relatively fixed teeth of the chopper, which will permit the same to yield and move away from the moving teeth of the chopper, in this way, releasing any hard, foreign body from the mechanism.

In the preferred embodiment of the invention, it includes rotary cutter bearing teeth, and adjacent to the paths of these teeth, relatively fixed teeth are mounted to cooperate with the moving teeth to effect the cutting or chopping of the material that is fed into the machine. One of the objects of the invention is to mount the fixed teeth in such a way that the strain upon them is reacted to advantageously, by a fixed part of the frame. In other words, the relatively fixed teeth are mounted in a tangential position so that the pull upon them exerted by the chopping operation, is taken up by a fixed part of the frame, while at the same time, if a foreign body comes between the rotary cutter and the relatively fixed teeth, the fixed teeth can yield, and move or swing away from the rotary cutter.

Further objects of the invention will appear hereinafter.

The invention consists of the novel parts and combination of parts to be described hereinafter, all of which contribute to produce an efficient pineapple stump chopper.

A preferred embodiment of the invention is described in the following specification, while the broad scope of the invention is pointed out in the appended claims.

In the drawing:

Figure 1 is a vertical section taken in the front and rear direction through the machine embodying my invention, and showing the cutting apparatus together with contiguous parts of the machine. This section is taken about on the line 1—1 of Fig. 2.

Figure 2 is an elevation of one end of the chopping apparatus, and may be regarded as a section on the line 2—2 of Figure 1, certain parts being broken away.

Referring more particularly to the parts, the implement illustrated, comprises a frame 1 mounted upon wheels and provided with means for advancing it in the pineapple field. For this purpose the machine is provided at its forward end with means for connecting it to a tractor (not illustrated). As the machine is advanced, inclined plows or teeth dig into the earth and raise the pineapple stumps. In Figure 1 the rear end 2 of one of these plows, is illustrated. These plows are in the form of small beams located equidistant across the machine, and in the operation of the apparatus, the pineapple stumps are conveyed back and upwardly on the plows 2 by an endless conveyor 3 employing a chain or belt carrying dogs 4 for engaging the pineapple stumps. This belt runs over a drum 5 adjacent to the chopping mechanism, and this drum is preferably provided with a plurality of radial teeth 6 that feed the pineapple stumps back into the chopping mechanism. This chopping mechanism preferably includes a movable member such as a rotary drum 7, provided with a plurality of radially disposed teeth 8, which are arranged in rows and spaced equidistant from each other, the teeth on the different rows being staggered with relation to each other. For this purpose the drum may be of skeleton form and provided with a plurality of longitudinal bars 9 (see Fig. 2), which carry these teeth.

The drum may be provided with a longitudinal shaft 10, the ends of which are mounted in suitable bearings 11, indicated in dotted lines in Figure 1.

Adjacent to the path of the teeth 8, I provide cutter means including relatively fixed teeth to cooperate with the teeth 8, and this cutter means is mounted in such a way that in case a hard, foreign body such as a stone or rock comes in with the pineapple stumps, the relatively fixed cutter means will yield and permit the foreign body to drop out of the machine. In this way, the breaking of teeth is avoided. In Figure 1, 12 indicates the relatively fixed cutter means, which preferably consists of a plurality of tooth bars 13 mounted so that they extend substantially tangentially to the rotary cutter 7. These bars are mounted so that they can swing away from the cutter. For this purpose the forward ends of the bars are formed into hooks 14 that are hung on a fixed cross bar 15 mounted in the machine, and located adjacent the feeding point for the vegetable matter. Cooperating with this fixed support 15, I provide holding means for further supporting the bars 13, which will permit them to yield away from the rotary cutter for the purpose referred to above. In the present instance, the rear ends of the cutter bars are supported by means of frangible means such as the pins 16. These pins are mounted in fixed brackets 17 secured to the cross beam 18 of the frame. The brackets 17 may consist of oppositely disposed plates, between which the end of the corresponding tooth bar is received. The tooth bar is preferably provided with a plurality of small openings 19 to receive the pin 16, and these openings are arranged equidistant in an arc about the axis of the bar 15, so that the tooth bar can be mounted at any desired distance from the axis of the drum 7. Each tooth bar 13 is provided with a plurality of teeth 20 that project toward the drum or rotary cutter 7, and the tooth bars 13 are mounted between the planes of rotation of the teeth 8, for example, as indicated in Figure 2.

Suitable means is provided for rotating the rotary cutter 7. In the present instance, this is accomplished by the drive chain 21 driven by a sprocket wheel indicated by the dotted line 22 in Figure 1. This sprocket wheel is rigid on a shaft 23 of a ground wheel 23ª. A similar sprocket chain 24 is provided for driving the shaft 25 of the feed drum 5.

Above the rotary cutter 7 a baffle plate 26 is provided, which houses the upper side of the rotary cutter and operates in throwing down chopped pieces of the pineapple stumps which may fly upwardly during the operation of the machine.

As the implement is advanced over the ground, the pineapple stumps are picked up by the plows 2, and are automatically fed by the conveyor 3 onto the forward ends of the tooth bars 13 which guide the stumps back so that they pass between the fixed teeth 20 and the rotating cutters 8. The chopped stalks or stumps then fall to the ground to the rear of the cross beam 18. If a foreign body such as a rock or stone comes in with the pineapple stumps, the downward strain on adjacent tooth bars 13 will break their frangible pins 16 and permit them to drop down as indicated by the dotted lines in Figure 1. This will permit the stone or rock to fall out of the machine onto the ground.

Attention is called to the fact that the tooth bars are mounted so that practically all the strain upon them in the cutting operation, is in a direction to place tension in the bars, which is resisted by the hanger bar 15 on which these tooth bars are supported. Hence, none of this strain is imparted to the pins 16. The only strain on these pins happens when a foreign body passes into the cutting mechanism. This effect follows from the fact that the tooth bars are mounted in a substantially tangential position with respect to the rotary cutter 7.

It is understood that the embodiment of the invention described herein is only one of the many embodiments this invention may take, and I do not wish to be limited in the practice of the invention, nor in the claims, to the particular embodiment set forth.

What I claim is:—

1. In a machine of the kind described, the combination of a movable cutter device with cutters carried thereby, relatively fixed cutter-means to cooperate with the first-named cutters, and holding means located at the side of said fixed cutter-means, toward which the moving cutters move, for holding the relatively fixed cutters adjacent to the path of the movable cutters, said holding means being capable of yielding to permit the adjacent side of the relatively fixed cutter-means to move away from the movable cutter-means, when a foreign body comes between the same, said parts cooperating to maintain the relatively fixed cutter-means thereafter out of the path of the movable cutter.

2. In a machine for cutting up vegetable matter, the combination of a frame, a rotary cutter device mounted in the frame, teeth carried thereby, relatively fixed cutter-means having teeth located adjacent the paths of the first-named teeth, said cutter-means having a fixed support located forward of the axis of rotation of the rotary cutter, adjacent the feeding point of the machine, and extending substantially horizontally under the rotary cutter, and means for yieldingly supporting the relatively fixed cutter-means at a point under the rotary cutter and on the side thereof toward which the teeth of the rotary cutter move, to enable the relatively fixed cutter-means to be displaced away from the rotary cutter device on the side thereof toward which the movable cutter-means moves, in case a foreign body comes into the space between the rotary cutter and the relatively fixed teeth, said parts cooperating so that when the relatively fixed cutter-means is displaced it will maintain itself out of the path of the moving teeth.

3. In a machine for cutting up vegetable matter, the combination of a frame, a rotary cutter device mounted in the frame, teeth carried thereby, relatively fixed cutter-means comprising a plurality of bars having teeth located adjacent the paths of the first-named teeth, means for supporting the bars at a point located forward of the axis of rotation of the rotary cutter device and toward the feeding point of the machine, and frangible members for mounting the relatively fixed bars operating to break and enable the same to withdraw from the rotary cutter device in case a foreign body comes into the space between the rotary cutter and the relatively fixed teeth, said parts cooperating so that any withdrawn bar will maintain itself in its withdrawn position.

4. In a machine for cutting up vegetable matter, the combination of a frame, a rotary cutter device mounted in the frame, teeth carried thereby, relatively fixed cutter-means having teeth located adjacent the paths of the first-named teeth, said relatively fixed cutter-means including a plurality of bars extending under, and substantially tangentially to, the rotary cutter, and having teeth located adjacent the paths of the first-named teeth, means for supporting the fixed cutter-means at a point located forward of the axis of rotation of the rotary cutter and toward the feeding point of the machine, and frangible means for supporting the relatively fixed cutter-means adjacent the rotary cutter and at a point on the side of the fixed cutter-means toward which the movable cutters move, said parts cooperating to enable the relatively fixed teeth to swing away from the rotary cutter in case a foreign body comes into the space between the rotary cutter and the relatively fixed teeth.

5. In a machine for cutting up vegetable matter, the combination of a frame, a rotary cutter device mounted in the frame, teeth carried thereby, relatively fixed cutter-means having teeth located adjacent the paths of the first-named teeth, relatively fixed cutter-means including a plurality of relatively fixed bars extending across under the rotary cutter in the direction in which the movable cutters move, and substantially tangentially to the rotary cutter, a hanger bar located forward of the axis of rotation of the rotary cutter and toward the feeding point of the machine and extending substantially parallel to the axis of the rotary cutter for supporting the fixed cutter-means at that side, and frangible means associated with each relatively fixed bar, located under the rotary cutter for supporting the same at a point toward which the movable teeth move.

6. In a machine for cutting up vegetable matter, the combination of a frame, a rotary cutter device mounted in the frame, teeth carried thereby, relatively fixed cutter-means having teeth located adjacent the paths of the first-named teeth, and including a plurality of tooth bars extending under the rotary cutter in the direction in which the vegetable matter passes, and having teeth lying adjacent to the paths of the rotary teeth, means for pivotally supporting said bars at a point forward of the axis of rotation of the rotary cutter and toward the feeding point of the machine to enable the bars to swing away from the rotary cutter toward the rear side of the rotary cutter, and frangible means for individually supporting the bars at another point located under the rotary cutter, said parts cooperating when the frangible means of a bar is broken, to permit that bar to swing away from the rotary cutter on the side toward which the movable cutters move.

CHARLES VICTOR MORINE.